Sept. 27, 1932.    H. H. MILLER    1,879,392
PASTEURIZER
Filed Feb. 10, 1930    5 Sheets-Sheet 1

INVENTOR
Harvey H. Miller
By Geo. B. Pitts
ATTORNEY

Sept. 27, 1932.  H. H. MILLER  1,879,392
PASTEURIZER
Filed Feb. 10, 1930   5 Sheets-Sheet 3

INVENTOR
Harvey H. Miller
By
Geo. B. Pitts
ATTORNEY

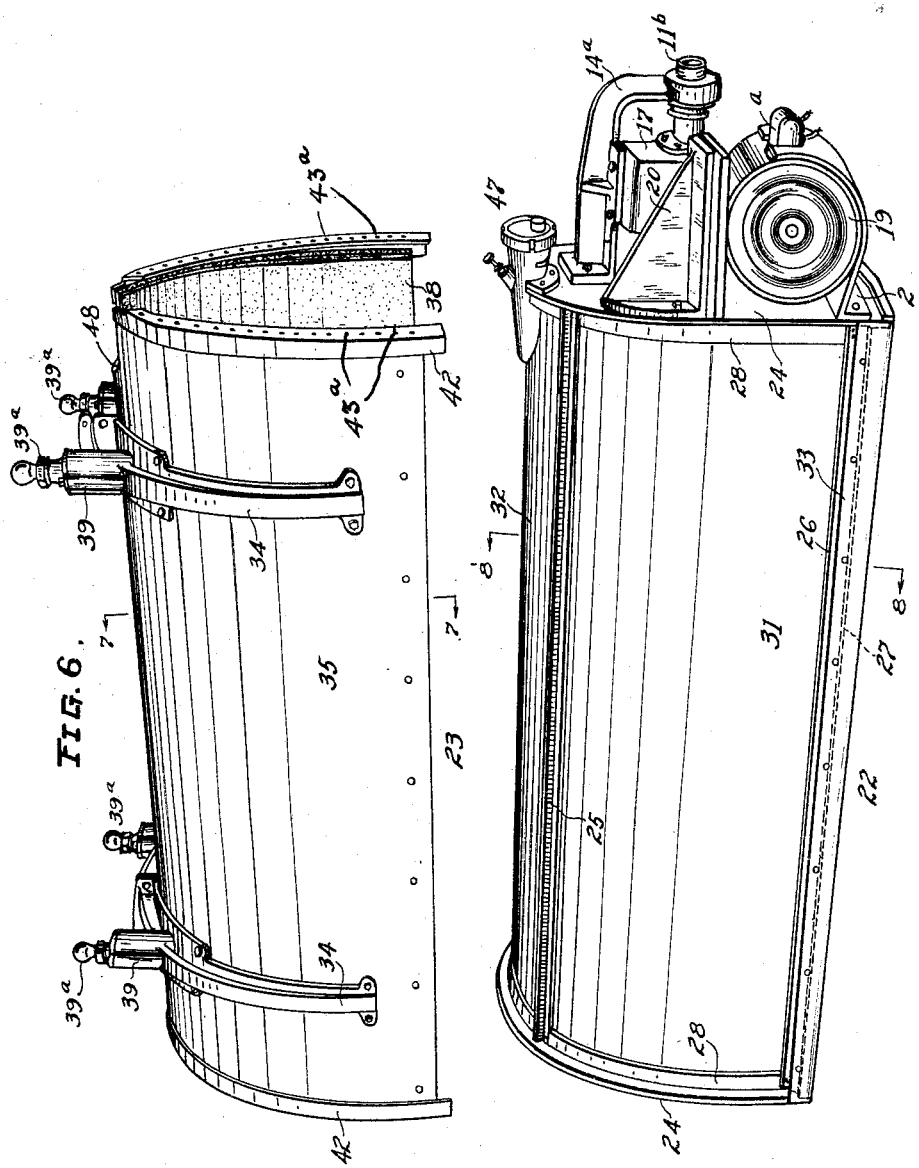

Sept. 27, 1932.   H. H. MILLER   1,879,392
PASTEURIZER
Filed Feb. 10, 1930    5 Sheets-Sheet 5

Patented Sept. 27, 1932

1,879,392

UNITED STATES PATENT OFFICE

HARVEY H. MILLER, OF CANTON, OHIO, ASSIGNOR TO THE H. H. MILLER INDUSTRIES COMPANY, OF CANTON, OHIO, A CORPORATION OF OHIO

PASTEURIZER

Application filed February 10, 1930. Serial No. 427,403.

This invention relates to a vat or holder for liquid, more particularly for milk or cream. In the application of the invention I have shown the vat as equipped for heating or cooling or pasteurizing milk or cream, for which reason the walls of the vat are provided with suitable heat insulating material.

One object of the invention is to provide a vat comprising inner and outer members which may be readily separated one from the other to permit of repairs.

Another object of the invention is to provide a vat having an inner wall of relatively thin sheet material and a frame for such wall so constructed that the vat may be moved and handled without imparting strains to the wall, whereby danger of its seams opening and distortion is eliminated.

Another object of the invention is to provide a vat comprising a liquid holding section consisting of sides and bottom of relatively thin, sheet material and end walls connected in fixed relation and a shell fitting the sides and bottom of the holding section, but separable therefrom a readily permit repairs to the liquid holding section.

A further object of the invention is to provide in a vat having internal rotating parts, rigid end walls, which support the rotating parts and driving means therefor, connected together in fixed spaced relation to provide a unitary section, whereby the sides and bottom of the inner walls may be formed of thin sheet stock.

Other objects of the invention will be apparent to those skilled in the art to which my invention relates from the following description taken in connection with the accompanying drawings, wherein Fig. 1 is a side view of a vat (parts being broken away) embodying my invention.

Fig. 6 is a perspective view showing the outer member of the vat separated from the inner member.

Figure 4:
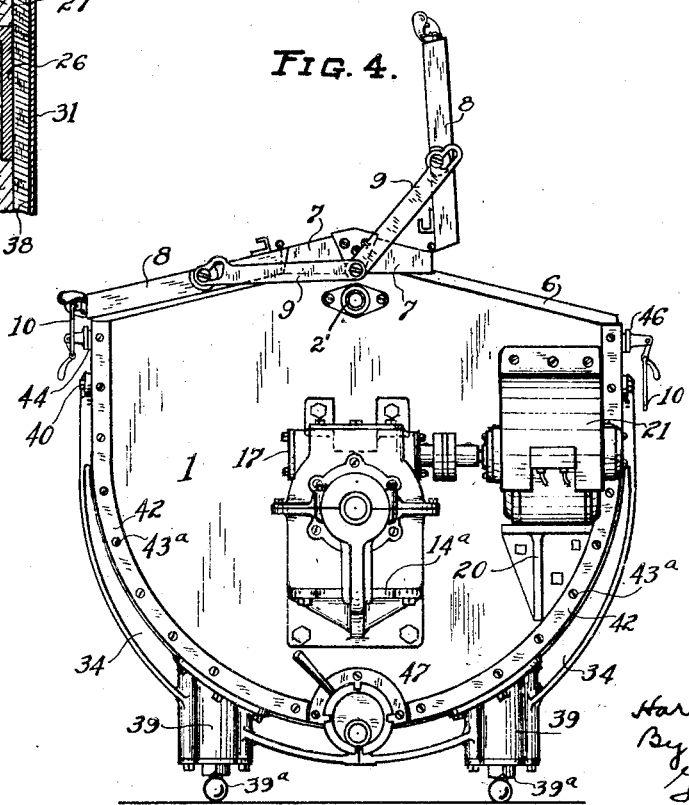
Fig. 4 is an end elevation looking toward the left of Figs. 1 and 2, but showing one of the covers raised.
Figure 7:
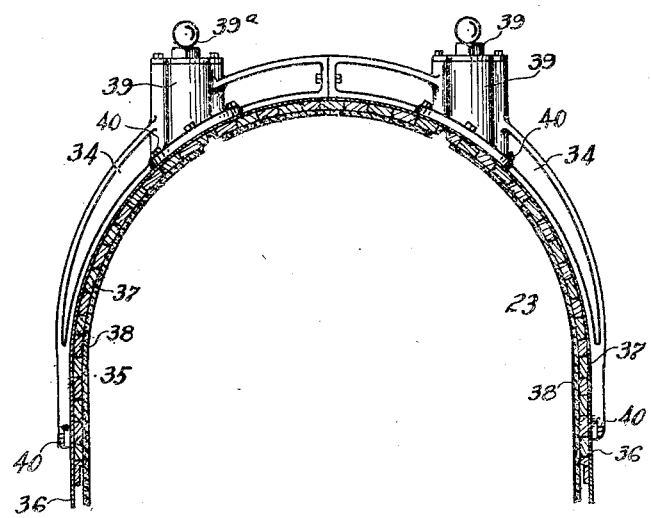
Figs. 7 and 8 are transverse sections of the two members, these sections being on the line 3—3 of Fig. 1 but showing them inverted.
Figure 8:
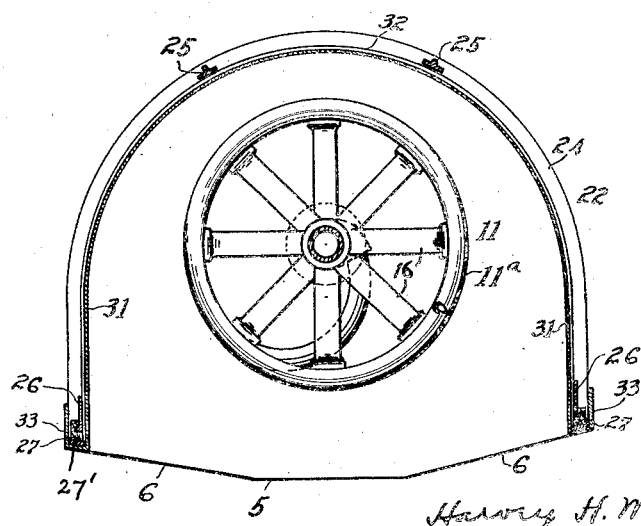

In the drawings, 1 indicates as an entirety the vat having end walls 2, side walls 3 and a bottom 4. By preference the bottom and lower portions of the sides are curved or rounded. The upper edges of the end walls have central horizontal portions 5 and downwardly inclined outer portions 6. The portions 5 form a support for a stationary cover section 7, the latter being detachably secured to the portions 5 in any desired manner, and the portions 6 form supports for covers 8 which are hinged along their inner edges to the side edges of the cover section 7, whereby the covers 8 may be lifted, as shown in Fig. 4, to permit access to the vat. When lifted the covers 8 may be braced by suitable brackets 9. The covers 8 are held in closed position by suitable locking elements 10.

11 indicates as an entirety a rotatable member which preferably serves to stir the material and to circulate a heat transfer medium, namely, cold water or brine or other refrigerant to cool the liquid or hot water or steam to heat it. In such form of construction the rotatable member includes a coiled pipe 11a extending substantially from end to end of the vat and terminating at its ends in hollow shafts 11b to which suitable supply and discharge pipes (not shown) are connected. The shafts 11b extend through and rotate in suitable collars 12 mounted in openings 13 formed in the end walls 2. The shafts 11b are supported at their outer ends in bearings provided in brackets 14, 14a, secured to the end walls 2. The shafts 11b are connected together by a shaft section 15 which carries a plurality of arms 16 to support the coil 11a intermediate its ends. The heat transfer medium flows into one shaft 11b, then through the coiled pipe 11a and escapes or discharges through the other shaft 11b. The outer ends of the shafts 11b are suitably threaded so that the supply and discharge pipes may be coupled thereto. 17 indicates a box supported on the bracket 14a and enclosing a suitable gear train of the reduction type, connected to the adjacent shaft 11b to rotate it. The box 17 may be braced by a spacer 14b. The gear train is driven by the shaft 18 of an electric motor 19 (see Fig. 6) fixed to a support 20, which is secured to the adjacent end wall 2. The motor 19 may be enclosed in a casing 21.

The vat 1 comprises two members 22, 23, which, in associated or assembled relation, as shown in Figs. 1, 2, 3 and 4, constitute a unitary structure having a liquid tight inner wall, but which may be separated, one from the other, to permit of repairs to either. This disassembly or separation is particularly advantageous where leaks develop in the inner wall or its seams open, as it permits such damage to be repaired in a ready and satisfactory manner and without tearing down any part of the structure or sending same to the factory or other place of repair.

Figure 1:
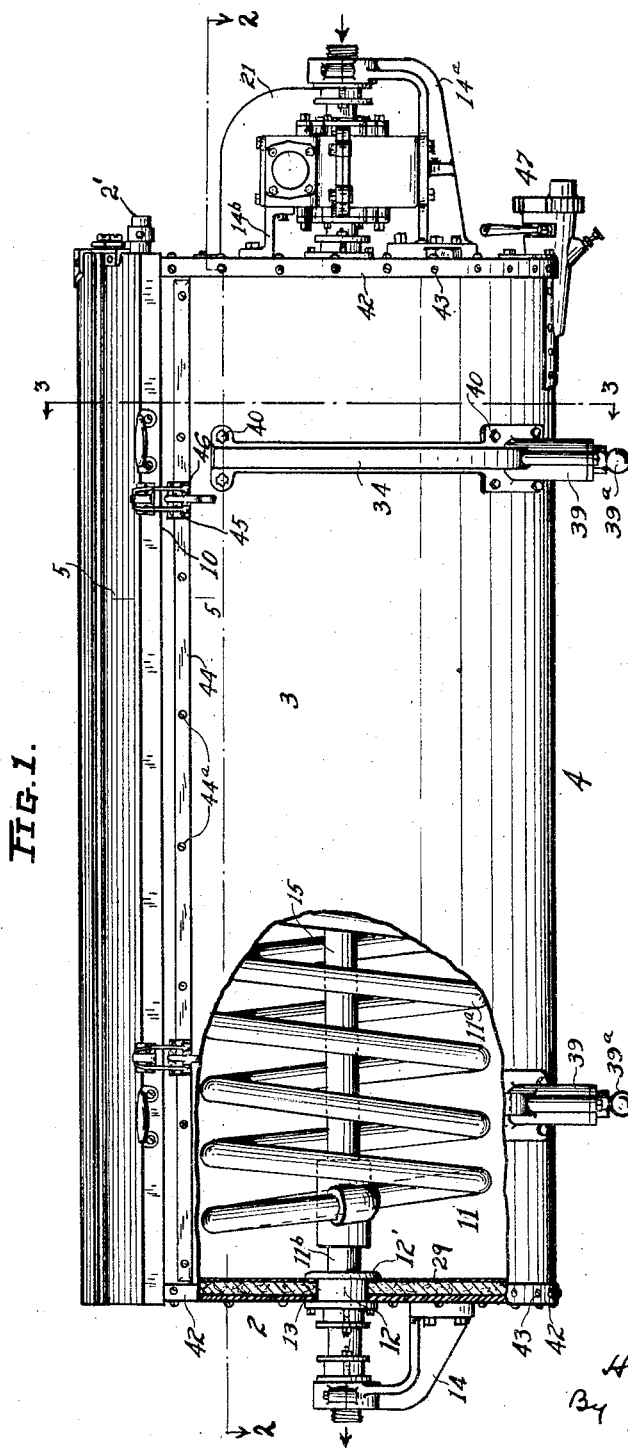

The member 22 comprises the following: 24 indicates a pair of castings of suitable metal, such as iron or steel, connected together in fixed, spaced relation by a plurality of bars 25, preferably of T-shape in cross section, a pair of angle bars 26 and pairs of members, each pair preferably consisting of a wooden bar 27 and a metal strip 27'. The inner face of each casting 24 is provided with a rib 28 which extends continuously along but spaced from the side and bottom edges of the casting. The opposite ends of the bars 25 and angles 26 are secured in any suitable manner rigidly to the outer wall of the rib 28, whereas each pair of members 27, 27', are suitably secured to the adjacent angle 26. That portion of each casting within the rib 28 is faced with suitable non-heat-ing conducting material 29, such as blocks or slabs of cork. 30 indicates the inner wall formed from relatively thin, sheet stock of suitable material, such as stainless steel, copper, German silver, Monel metal or nickel, as desired. The wall 30 consists of end portions 30a which are fitted flat against the insulations 29, sides 31 and a bottom 32, the end edges of the sides and bottom being soldered to the edges of the end portions 30a. The sides 31 and bottom 32 are formed from two or more sections of sheet material, these sections being joined or seamed along their adjoining edges in any desired manner. As shown in Fig. 1, the end portions 30a, material 29 and castings 24 are formed with openings to receive the collars 12, the latter being preferably flanged, as shown at 12' to prevent leakage; and these parts at one end of the vat are formed with openings for a supply pipe 2', whereby the vat may be filled. The upper opposite longitudinal side portions of the sides 31 are extended and bent over the members 27, 27', and then bent downwardly to form flanges 33 extending from end to end of the sides. The purpose of these flanges will later appear.

Figure 2:
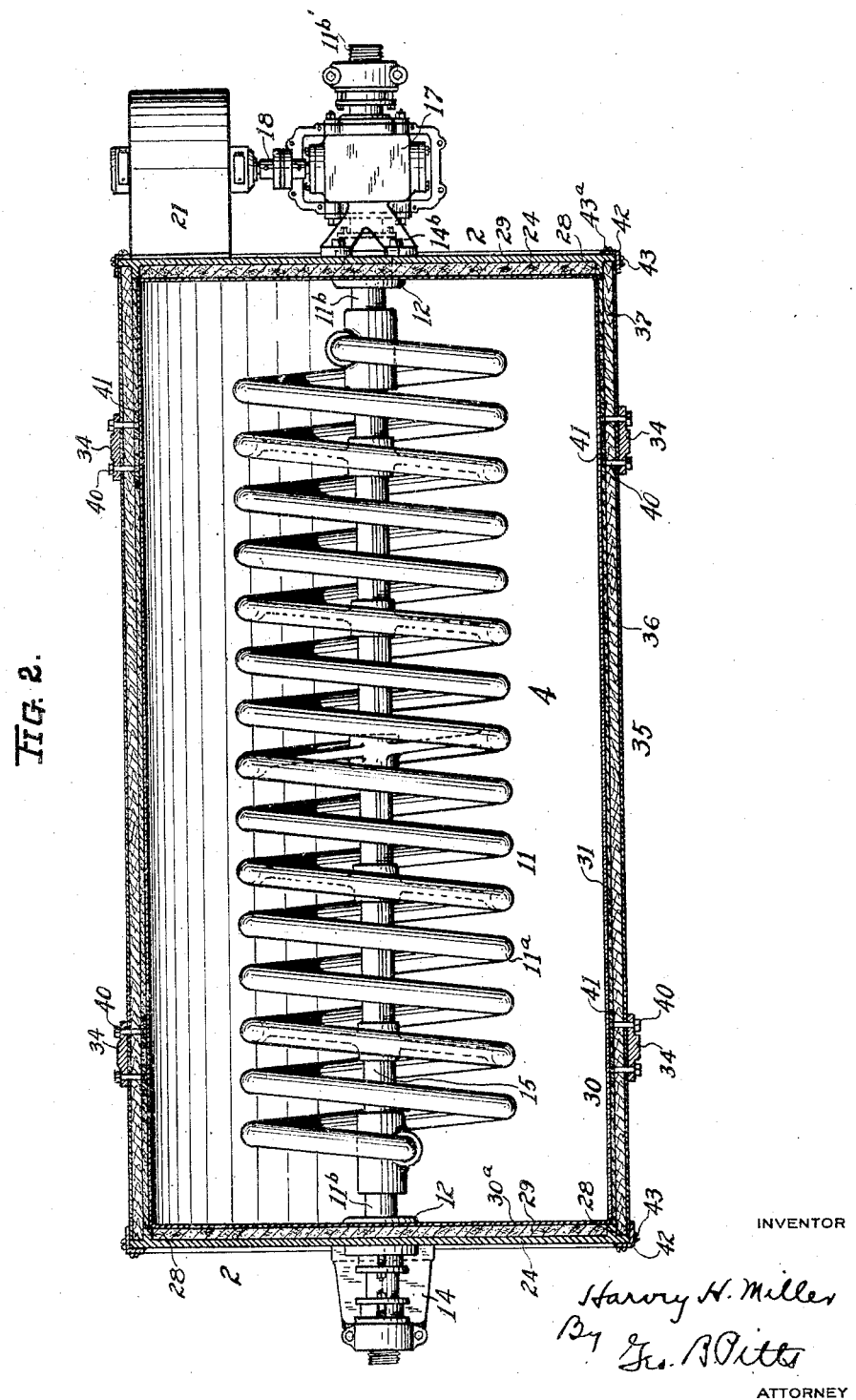
Fig. 2 is a section on the line 2—2 of Fig. 1.
Figure 3:
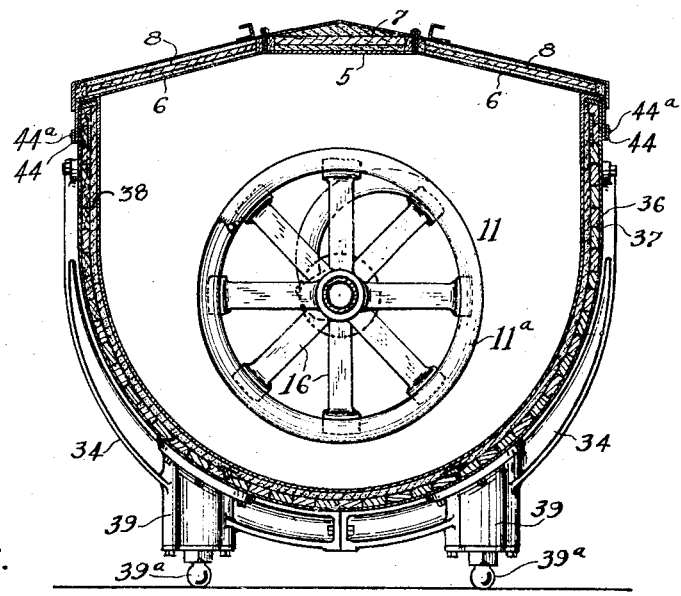
Fig. 3 is a section on the line 3—3 of Fig. 1.
Figure 5:
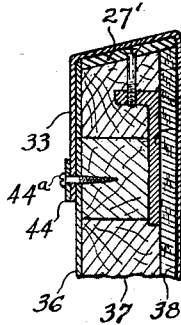
Fig. 5 is a fragmentary section on the line 5—5 of Fig. 1, the adjacent cover being omitted.

The member or section 23 is shaped to receive the member 22 and enclose its sides and bottom between the end castings 24, the opposite ends and longitudinal sides of the section being shaped for complementary relation with adjacent portions of the member 22, whereby the members 22, 23, when assembled, constitute a unitary apparatus. The section 23 comprises the following: 34 indicates pairs of curvilinear castings, each pair forming a U-shaped frame. The U-frames are suitably spaced and support a wall 35 of U-shape in cross section, the wall 35 consisting of a surfacing sheet 36, a layer 37 formed of strips of wood laid side edge to side edge and an inner layer of cork 38. The castings 34 are formed with legs 39 each of which is provided with an adjustable section 39a. The wall 35 is secured to the castings 34 by bolts 40, the heads of the bolts being countersunk in plates 41 secured to the layer 37 (see Fig. 2). The member 23 is preferably similar in shape in cross section to that of the member 22, so that the sides 31 and bottom 32 of the latter rest upon and are supported by the wall 35, spaces being provided in the wall to accommodate the T-bars 25. As shown in Fig. 2, the opposite ends of the layer of cork 38 is cut away so that the ends of the wood strips 37 may rest on the outer surfaces of the ribs 28 and against or within the inner faces of the castings 24 (see Fig. 2).

The means for securing the members 22, 23, together in assembled relation comprise the following: 42 indicates an angle strip extending along the sides and bottom edges of the castings 24, one angle portion of the strip being secured to the wall 36 by screws 43 and the other angle portion of the strip being secured to the castings 24 by screws 43a. 44 indicates a strip extending along each flange 33, screws 44a extending through the strip 44, the flange 33, sheet 36 and secured in the adjacent wood strip 37a; I may also secure the strip 37a to the angle 26 by a plurality of machine screws (not shown) access to which is provided through openings in the flange 33 and sheet 36, these openings being covered by the strip 44. The screws or bolts 45 which secure the supporting plates 46 for elements of the cover clamping devices 10 by preference screw into the bars 26 and also serve as supplemental means for securing the members 22, 23, together.

As the opposite ends of the member 23 fit between and against the inner faces of the castings 24, it will be seen that it serves to brace and reinforce the member 22, so that the vat 1 may be moved on the floor as well as inverted without danger of damaging, straining or distorting the walls 30a, 31, 32.

To disassemble the members 22, 23, I prefer to first remove the covers 7 and 8, 8. Next, I invert the vat; next, I remove the plates 46, strips 44 and the screws 43a to disconnect the angle strips 42 from the castings 24, and finally I raise the member 23 relative to the member 22 to the position shown in Fig. 6.

This process is advantageous since the member 23 being materially lighter in weight than the member 22, less power is required to raise it; also, this process leaves the member 22 inverted on the floor and therefore in suitable position to permit of repairs to it.

47 indicates a discharge valve for controlling the discharge of milk or cream from the vat 1. The valve 47 is preferably similar in construction to the valve shown in a copending application filed by Morris E. Miller, Ser. No. 306,631. The valve 47 being mounted on one of the castings 24, it in no wise affects the assembly and disassembly of the members 22, 23. As the casing for the valve extends below the bottom 32, the bottom of the member 23 may be cut away at 48 to accommodate the casing.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. A container consisting of inner and outer members removably fitted together, the inner member comprising rigid end walls, longitudinal elements for connecting said end walls in rigid spaced relation, and sheet metal bottom and side walls secured to said end walls, and the outer member comprising bottom and side walls shaped to receive said inner member, and means for removably securing said members together.

2. A pasteurizer or holder for fluid consisting of a container and an insulating member, said container comprising rigid end walls, bottom and side walls formed of sheet material secured to said end walls, and rigid connections between said end walls for spacing them in rigid relation and said insulating member comprising bottom and side walls fitting said bottom and side walls of said container, and means for removably securing said container and member together.

3. A pasteurizer or holder for fluid consisting of a container and an insulating member, said container comprising rigid end walls, bottom and side walls formed of sheet material secured to said end walls, connectors between said end walls for spacing them in rigid relation and said insulating member comprising bottom and side walls fitting said bottom and side walls of said container, between said end walls, and means for securing said container and member together.

4. A pasteurizer or holder for fluid consisting of a container and an insulating member, said container comprising rigid end walls and bottom and side walls formed of sheet material secured to said end walls, and connectors between said end walls, and said insulating member having a bottom and sides comprising an outer supporting wall and an inner wall of insulating material, and means for removably securing said container and member together.

5. A pasteurizer or holder for fluid consisting of a container, an insulating member and agitating means within said container, said container comprising rigid end walls arranged to support said agitating means, bottom and side walls formed of sheet material secured to said end walls and rigid connections between said end walls exterior to said bottom and side walls and said insulating member having a bottom and sides and comprising an outer supporting wall and an inner wall of insulating material, and means for removably securing said container and member together.

6. A pasteurizer or holder for fluid consisting of a container and an insulating member, said container comprising rigid end walls, and bottom and side walls, and said insulating member having a bottom wall and side walls, the free edges of the side walls of said container and member having interfitting portions, and means for securing said interfitting portions together.

7. A pasteurizer or holder for fluid consisting of a container and an insulating member, said container comprising rigid end walls each having a flange extending along its side and bottom edges, a bottom and side walls, said bottom and side walls being secured to said flanges, and said insulating member comprising a bottom and sides fitting within said end walls upon the flanges thereof, and angle strips extending along the outer faces of said end walls and the end portions of the bottom and sides of said insulating member for securing said container and member together.

8. A pasteurizer or holder for fluid consisting of a container and an insulating member, said container comprising rigid end walls each having a flange extending along its side and bottom edges, a bottom and side walls, said bottom and side walls being secured to said flanges, and said insulating member comprising a bottom and sides fitting within said end walls upon the flanges thereof, the side walls of said container being extended and folded over the side walls of said insulating member and secured thereto.

9. A pasteurizer or holder for fluid open at its top and consisting of a container and a supporting member, said container comprising rigid end walls, side walls and a rounded bottom connected to said end walls along the side and bottom edges thereof, connectors exterior of said side walls and bottom for maintaining said end walls in fixed, spaced relation, and said supporting member having sides and a bottom substantially complementary to the sides and bottom of said container, and means for securing said container and member together.

In testimony whereof, I have hereunto affixed my signature.

HARVEY H. MILLER.